United States Patent
Farquhar et al.

(10) Patent No.: US 12,552,478 B2
(45) Date of Patent: Feb. 17, 2026

(54) METHOD AND SYSTEM OF AUTOMATED VEHICLE BODY ROUTING SYSTEM EMPLOYING PREDICTED VEHICLE BODY IMPERFECTIONS AND VISION DETECTION SYSTEM

(71) Applicant: Ford Motor Company, Dearborn, MI (US)

(72) Inventors: Gary David Farquhar, Farmington Hills, MI (US); Marc Tornero Soria, Troy, MI (US); Brian Lucatch, Saint Clair Shores, MI (US); Mitchell Goepel, Lake Orion, MI (US)

(73) Assignee: Ford Motor Company, Dearborn, MI (US)

( * ) Notice: Subject to any disclaimer, the term of this patent is extended or adjusted under 35 U.S.C. 154(b) by 705 days.

(21) Appl. No.: 17/966,116

(22) Filed: Oct. 14, 2022

(65) Prior Publication Data

US 2024/0124079 A1 Apr. 18, 2024

(51) Int. Cl.
*B62D 65/00* (2006.01)
*B05D 5/00* (2006.01)

(52) U.S. Cl.
CPC ........... *B62D 65/005* (2013.01); *B05D 5/005* (2013.01)

(58) Field of Classification Search
CPC .......... G05B 19/4184; G05B 19/41875; G05B 2219/32228; G05B 2219/32233; G05B 2219/45013; B05D 5/005; B05D 7/14; B05D 7/58; B05D 1/02; B05D 1/36; B05D 7/54; B05B 12/12; B62D 65/005; B62D 65/18
See application file for complete search history.

(56) References Cited

U.S. PATENT DOCUMENTS

| 6,714,831 | B2 | 3/2004 | Matthews et al. |
| 6,826,497 | B1 * | 11/2004 | Collins .................. H04L 67/12 |
| | | | 702/81 |
| 8,204,294 | B2 | 6/2012 | Alloo et al. |
| (Continued) | | | |

FOREIGN PATENT DOCUMENTS

| CN | 112733884 | 4/2021 |
| CN | 113552849 | 10/2021 |
| (Continued) | | |

*Primary Examiner* — Christopher W Carter
(74) *Attorney, Agent, or Firm* — Burris Law, PLLC

(57) ABSTRACT

A method of directing a vehicle body through a paint process includes obtaining, by a vehicle manufacturing system, process operation data from a vehicle body process. The process operation data is indicative of an operation state of an identified machine performing a selected body operation as part of the vehicle body process. The method includes determining, by the vehicle manufacturing system, whether a recognized fault has occurred based on the process operation data, identifying a potential vehicle body imperfection based on a paint process model and the recognized fault, and providing, by the vehicle manufacturing system, a notification to the paint process of the potential vehicle body imperfection for the vehicle body, where the notification includes location information of the potential vehicle body imperfection, a remedial action for addressing the potential vehicle body imperfection, a recommended resource allocation, or a combination thereof.

19 Claims, 3 Drawing Sheets

(56) References Cited

U.S. PATENT DOCUMENTS

| | | | |
|---|---|---|---|
| 10,734,293 B2 | 8/2020 | David | |
| 11,029,359 B2 | 6/2021 | Honda et al. | |
| 11,227,378 B2 | 1/2022 | Burkhardt et al. | |
| 2003/0139836 A1* | 7/2003 | Matthews | G01N 21/8806 700/109 |
| 2020/0344449 A1* | 10/2020 | Allen | G01N 21/8851 |
| 2022/0114561 A1* | 4/2022 | Watts | G06Q 10/20 |
| 2023/0025165 A1* | 1/2023 | Allen | C25D 13/22 |
| 2023/0162243 A1* | 5/2023 | Southin | G06Q 30/06 705/306 |

FOREIGN PATENT DOCUMENTS

| | | |
|---|---|---|
| EP | 1828754 | 7/2013 |
| WO | 2020239198 | 12/2020 |

\* cited by examiner

METHOD AND SYSTEM OF AUTOMATED VEHICLE BODY ROUTING SYSTEM EMPLOYING PREDICTED VEHICLE BODY IMPERFECTIONS AND VISION DETECTION SYSTEM

FIELD

The present disclosure relates to a method and/or system of routing a vehicle body through a paint process.

BACKGROUND

The statements in this section merely provide background information related to the present disclosure and may not constitute prior art.

There are generally multiple processes in manufacturing a vehicle, and an upstream process may affect the performance/quality of a downstream process. This interaction with upstream and downstream processes can be seen at a paint process of a vehicle body. For example, prior to the paint process, a vehicle body is formed at a body stage of the manufacturing process of the vehicle, and the body stage can include shaping and then joining metal components using, for example, welding, adhesives, fasteners. During the welding process, the metal components may be close to a set tolerance without comprising structural integrity of a joint, but the joint may include small dimensional changes in panel overlap and crevices. These small changes can result in fluid being retained in certain locations of the vehicle body after paint immersion stages of the paint process. Retained fluid can then boil out when the vehicle body is in the oven causing visible defects on the surface of the vehicle body.

To further complicate matters, in some applications, an inspection of the vehicle body during the paint process may not take place until the end of the paint process. For example, a typical inspection system uses multiple cameras and an image processing software to locate and classify types of paint defects on the vehicle surface. After the automated inspection is completed, an operator reviews the data to determine where the vehicle body should be routed next based on their own opinion and past experiences. The number, type, and location of the defects determines whether the vehicle body must be completely repainted (routed back through the topcoat booth and oven), spot repaired (a small area is repainted in small section of the paint shop), or if it can proceed to next process such as final assembly.

Unfortunately, such inspection systems can be time consuming since the vehicle bodies are directed along the same predetermined paint process route and wait for a manual review. In addition, possible defects caused by upstream processes may not be addressed until after the vehicle body is painted causing inefficiency and a waste of resources. These and other issues related to routing vehicle bodies through the paint process are addressed by the present disclosure.

SUMMARY

This section provides a general summary of the disclosure and is not a comprehensive disclosure of its full scope or all of its features.

In one form, the present disclosure is directed to a method of directing a vehicle body through a paint process, the method includes: obtaining, by a vehicle manufacturing system, process operation data from a vehicle body process, where the vehicle body process is configured to form a vehicle body and precedes a paint process of the vehicle body, the vehicle body process includes a stamping process, a body forming process, or a combination thereof, and the process operation data is indicative of an operation state of an identified machine performing a selected body operation as part of the vehicle body process; determining, by the vehicle manufacturing system, whether a recognized fault has occurred based on the process operation data; identifying a potential vehicle body imperfection based on a paint process model and the recognized fault; and providing, by the vehicle manufacturing system, a notification to the paint process of the potential vehicle body imperfection for the vehicle body, where the notification includes location information of the potential vehicle body imperfection, a remedial action for addressing the potential vehicle body imperfection, a recommended resource allocation, or a combination thereof.

The following includes variations of the method of directing the vehicle body through the paint process of the above paragraph, which may be implemented individually or in any combination.

In some variations, the paint process model associates a plurality of potential faults for one or more machines performing the vehicle body process with one or more vehicle body imperfections, the recognized fault is provided from among the plurality of potential faults, the identified machine is selected from among the one of more machines, and the potential vehicle body imperfection is selected from among the one or more vehicle imperfections.

In some variations, the remedial action includes having the vehicle body undergo a selected pre-paint process, providing a customized operation setting for the paint process, or a combination thereof.

In some variations, the method further includes: directing the vehicle body to the paint process having a surface treatment process, a priming process, a base-clear (BC) coat process, or a combination thereof; obtaining, by a paint inspection system, a surface image data of the vehicle body subsequent of the surface treatment process, the priming process, the BC coat process, of a combination thereof; determining, by a paint inspection system, whether the vehicle body has at least one surface imperfection after the priming process and prior to a post-paint area of the vehicle body; determining, by the paint inspection system, one or more characteristics of the at least one surface imperfection based on the surface image data in response to determining that the vehicle body has the at least one surface imperfection; and selectively directing, by the paint inspection system, the vehicle body to a subsequent process based on the one or more characteristics of the at least one surface imperfection of the vehicle body and a body directive model configured to identify the subsequent process based on an input parameter, where the input parameter includes the one or more characteristics of the at least one surface imperfection of the vehicle body.

In some variations, the method further includes, in response to the notification from the vehicle manufacturing system, performing the remedial action to address the potential vehicle body imperfection prior to obtaining the surface image data.

In some variations, the one or more characteristics of the at least one surface imperfection includes at least one of a location of the at least one surface imperfection, a type of the at least one surface imperfection, and a size of the at least one surface imperfection.

In some variations, the subsequent process is selected from among a spot treatment process, a polish treatment process, and an assembly process.

In some variations, the method further incudes selectively directing the vehicle body to a final assembly in response to the vehicle body not having the at least one surface imperfection.

In one form, the present disclosure is directed to a method of directing a vehicle body through a paint process having a surface treatment process, a priming process, and a base-clear (BC) coat process. The method includes: obtaining, by a paint inspection system, a surface image data of the vehicle body subsequent of the surface treatment process, the priming process, the BC coat process, or a combination thereof; determining, by a paint inspection system, whether the vehicle body has at least one surface imperfection after the priming process and prior to a post-paint area of the vehicle body; determining, by the paint inspection system, one or more characteristics of the at least one surface imperfection based on the surface image data in response to determining that the vehicle body has at least one surface imperfection; and selectively directing, by the paint inspection system, the vehicle body to a subsequent process based on the one or more characteristics of the at least one surface imperfection of the vehicle body and a body directive model configured to identify the subsequent process based on an input parameter, where the input parameter includes the one or more characteristics of the at least one surface imperfection of the vehicle body.

The following includes variations of the method of directing the vehicle body through the paint process of the above paragraph, which may be implemented individually or in any combination.

In some variations, the one or more characteristics of the at least one surface imperfection includes at least one of a location of the at least one surface imperfection, a type of the at least one surface imperfection, and a size of the at least one surface imperfection.

In some variations, the subsequent process is selected from among a spot treatment process, a polish treatment process, and a final assembly.

In some variations, the method further includes selectively directing the vehicle body to a final assembly in response to the vehicle body not having the at least one surface imperfection.

In some variations, the input parameter further includes available resources of the subsequent process.

In some variations, the method further includes: determining whether the at least one surface imperfection is a reoccurring imperfection based on a previous detected imperfection of a previous vehicle body, based on the one or more characteristics of the at least one surface imperfection and the one or more characteristics of the previous detected imperfection; and issuing a notification regarding the reoccurring imperfection in response the at least one surface imperfection being determined as a reoccurring imperfection.

In some variations, the method further includes: obtaining, from a vehicle manufacturing system, a notification a potential vehicle body imperfection for the vehicle body prior to the paint process, where the notification includes location information of a potential vehicle body imperfection, a remedial action for addressing the potential vehicle body imperfection, a recommended resource allocation, or a combination thereof; and performing the remedial action to address the potential vehicle body imperfection prior to obtaining the surface image data.

In some variations, the remedial action includes having the vehicle body undergo a selected pre-paint process, providing a customized operation setting for the paint process, or a combination thereof.

In one form, the present disclosure is directed to a method of directing a vehicle body through a paint process. The method including: obtaining, by a vehicle manufacturing system, process operation data from a vehicle body process, where the vehicle body process is configured to form a vehicle body and precedes a paint process of the vehicle body, the vehicle body process includes a stamping process, a body forming process, or a combination thereof, and where the process operation data is indicative of an operation state of an identified machine performing a selected body operation as part of the vehicle body process; determining, by the vehicle manufacturing system, whether a recognized fault has occurred based on the process operation data; identifying a potential vehicle body imperfection based on a paint process model and the recognized fault; in response to identifying the potential vehicle body imperfection, performing a remedial action during the paint process to address the potential vehicle body; obtaining, by a paint inspection system, a surface image data of the vehicle body subsequent of a priming process, where the paint process includes a surface treatment process, the priming process, a base-clear (BC) coat process, and a post-paint area provided after the priming process and the BC coat process; determining, by a paint inspection system, whether the vehicle body has at least one surface imperfection after the priming process and prior to a post-paint area of the vehicle body; determining, by the paint inspection system, one or more characteristics of the at least one surface imperfection based on the surface image data in response to determining that the vehicle body has the at least one surface imperfection; and selectively directing, by the paint inspection system, the vehicle body to a subsequent process based on the one or more characteristics of the at least one surface imperfection of the vehicle body and a body directive model configured to identify the subsequent process based on an input parameter, where the input parameter includes the one or more characteristics of the at least one surface imperfection of the vehicle body.

The following includes variations of the method of directing the vehicle body through the paint process of the above paragraph, which may be implemented individually or in any combination.

In some variations, the remedial action includes having the vehicle body undergo a selected pre-paint process, providing a customized operation setting for the paint process, or a combination thereof.

In some variations, the paint process model associates a plurality of potential faults for one or more machines performing the vehicle body process with one or more vehicle body imperfections, the recognized fault is provided from among the plurality of potential faults, the identified machine is selected from among the one of more machines, and the potential vehicle body imperfection is selected from among the one or more vehicle body imperfections.

In some variations, the one or more characteristics of the at least one surface imperfection includes at least one of a location of the at least one surface imperfection, a type of the at least one surface imperfection, and a size of the at least one surface imperfection.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
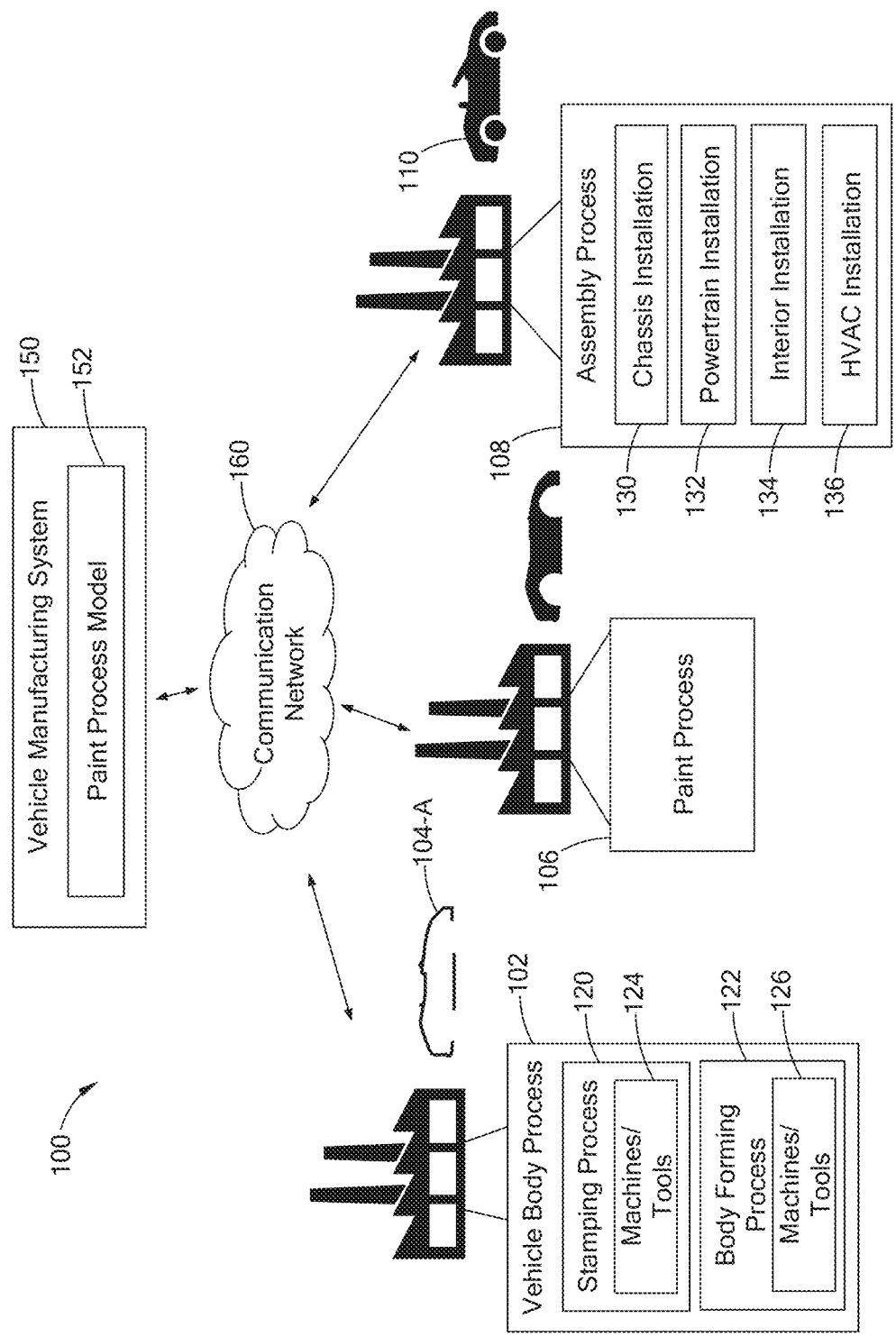
FIG. 1 illustrates an example vehicle manufacturing process in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example of vehicle manufacturing process 100 is illustrated. Generally, building a vehicle involves multiple processes that can be executed across one or more facilities. For example, the vehicle manufacturing process 100 includes a vehicle body process 102 to form a body of a vehicle (e.g., vehicle body 104 in FIG. 1), a paint process 106 to paint the vehicle body 104-A, and an assembly process 108 to assemble the vehicle body 104-B with other components to create a final vehicle 110. It should be readily understood that the vehicle manufacturing process 100 illustrated in FIG. 1 is for explanation purposes only and that the manufacturing process for different vehicles may differ and should not be limited to the example provided herein. For example, the number of facilities for performing the manufacturing process can be any number of facilities (i.e., one or more facilities) and the specific example processes described herein may also vary. In the following the vehicle body 104-A and 104-B may collectively be referred to as vehicle body 104.

In one form, the vehicle body process 102 includes a stamping process 120 during which sheet metal is stamped to form a portion of the vehicle body, and a body forming process 122 during which the vehicle body 104-A is built by joining the stamped components and in some instances, other components together. The stamping process 120 can include various machines/tools 124 for forming stamped components such as but not limited to: ovens for heating sheet metal, stamping/press machines, and robotic systems for handling the sheet metal/components. Similarly, the body forming process 122 may include different type of machines/tools 126 for joining the stamped components together, such as but not limited to: welders, adhesive dispensers, robotic systems for handling and/or joining components, fastening devices (e.g., automatic screw drivers, automatic wrenches, etc.).

Accordingly, from the vehicle body process 102, the vehicle body 104-A is formed and typically, provided to the paint process 106 for painting. An example implementation of the paint process 106 is described below with reference to FIGS. 3 and 4. From the paint process 106, the vehicle body 104-B moves to the assembly process 108 during which the vehicle body 104-B is assembled with components/subsystems to form the vehicle 110. For example, the vehicle body 104-B may undergo a chassis Installation 130, a powertrain installation 132, an interior installation 134, and a climate system installation 136.

In one form, a vehicle manufacturing system 150 is provided to monitor the various processes (e.g., the vehicle body process 102, the paint process 106, and the assembly process 108) based at least on data from devices at the processes, where the devices includes, but is not limited to, machines, tools, sensors, and/or robotic systems. More particularly, the vehicle manufacturing system 150 is configured to analyze data from one or more upstream processes to determine or predict whether possible faults at an upstream process may cause a vehicle body imperfection that may affect the paint process 106.

Figure 2A:
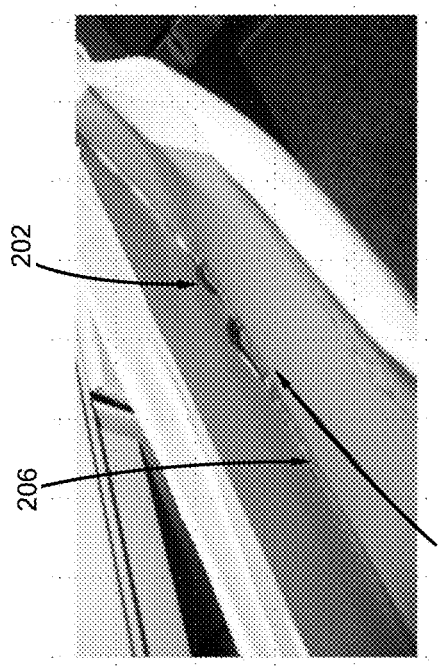
FIGS. 2A to 2C are images of example imperfections to a vehicle body.
Figure 2C:
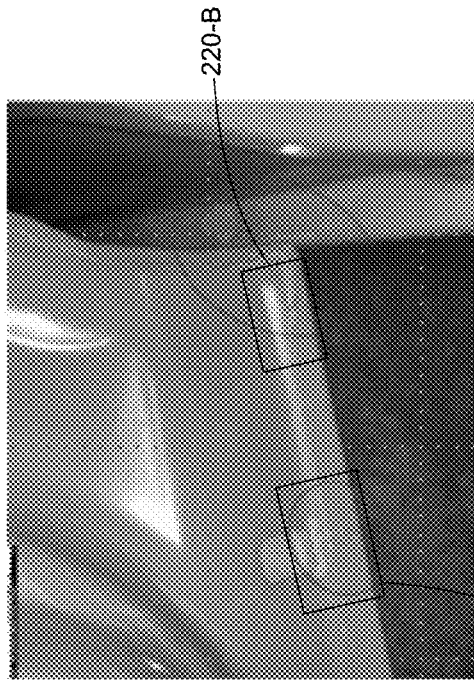
Figure 2B:
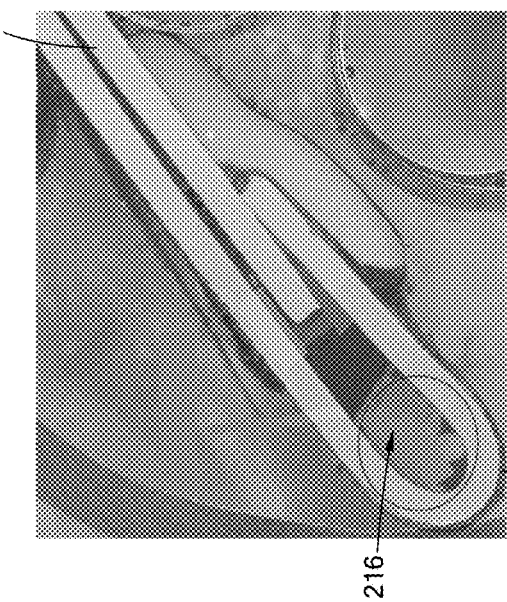

Specifically, at times, the quality of the paint applied to the vehicle body 104-A can be affected by the upstream build at the vehicle body process 102. For example, FIGS. 2A to 2C illustrate imperfections in the vehicle body due to a faulty machine operation at the vehicle body process 102. Specifically, FIG. 2A illustrates adhesive gaps 202, 204 along a seam 206 due to a possible fault or unexpected change of an adhesive system at the body forming process 122. In another example, referring to FIGS. 2B and 2C, an outer panel 210 and an inner panel 212 are secured together with an adhesive. In FIG. 2B, there is no adhesive at void 216. Accordingly, during the paint process 106, when the panels 210, 212 are immersed in a fluid, the fluid can be trapped in the void 216 causing the fluid to runout or boil out when the panels are placed in an oven. The runout are generally identified by enclosures 220A and 220B in FIG. 2C. These imperfections can be addressed at repair stations, but can employ additional resources dedicated to addressing the quality issue, which may require advance planning.

In one form, the vehicle manufacturing system 150 may be provided as one or more servers that obtain process operation data from the vehicle body process 102, where the process operation data is indicative of an operation state of an identified machine performing a selected body operation as part of the vehicle body process 102. In an example application, the process operation data may be indicative of, but should not be limited to: a high/low volume alarm of a body shop adhesive application; a fault detected by a laser machine/brazing machine/welding machine; abnormal facility environment conditions (e.g., high/low temperature, pressure, and/or humidity); and/or high/low lubrication alarm at a stamping machine. Using the process operation data, the vehicle manufacturing system 150 is configured to determine whether a recognized fault has occurred. More particularly, the vehicle manufacturing system 150 is configured to associate operation state of one or more machines performing one or more body operations with possible faults that are further associated with imperfections in the vehicle body that may affect the paint process 106. For example, using known data analytics, data from the vehicle body process 102 is analyzed and tracked to faults identified during the paint process 106. Based on the analysis and known data modeling techniques, a paint process model 152 is defined to use inputs indicative of identified faults from the vehicle body process to predict potential faults, quality issues, and/or among other product issues at the paint process 106.

Specifically, in one form, the vehicle manufacturing system 150 is configured to identify a potential vehicle body imperfection based on a recognized fault using the paint process model 152. In one form, the paint process model 152 associates multiple potential faults of one or more machines performing the vehicle body process 102 with one or more vehicle body imperfections. Accordingly, the recognized fault is provided from among the multiple potential faults, the identified machine is selected from among the one of more machines, and the potential vehicle body imperfection is selected from among the one or more vehicle imperfections. In addition to some potential faults discussed above, additional faults and imperfections can include fluctuation in facility ambient conditions that may cause the vehicle body imperfections. In another example, a metal stamping lubricant alarm may be associated with a change in pretreat/electrocoat (E-coat) chemistry, which may be addressed by additional cleaning or preemptive E-coat bath modifications or post process corrective actions.

The vehicle manufacturing system 150 is further configured to provide a notification to the paint process 106 of the potential vehicle body imperfection for the vehicle body 104-B, where the notification includes location information of the potential vehicle body imperfection, a remedial action for addressing the potential vehicle body imperfection, a recommended resource allocation, or a combination thereof. The remedial action includes having the vehicle body undergo a selected pre-paint process 106, providing a customized operation setting for the paint process 106, or a combination thereof. In another example, the recommended resource allocation may include information related to the number of technicians needed to perform the remedial action, material needed for the remedial action, and/or estimated time for performing the remedial action.

In one form, the vehicle manufacturing system 150, the vehicle body process 102, the paint process 106, and the assembly process 108 are communicably coupled via a communication network 160, which may include a wireless and/or wired network. Accordingly, the communication network 160 is supported by software protocols executable by processors, communication cable networks, modems, transceivers, among other software and/or hardware components provided at the system 150 and processes 102, 106, and 108.

Figure 3:
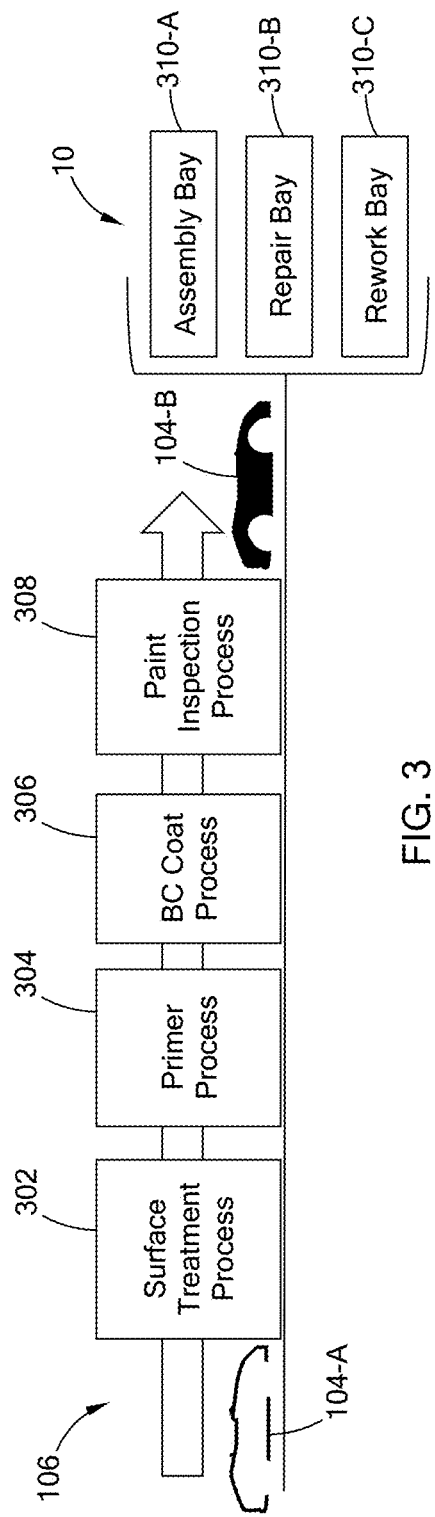
FIG. 3 illustrates an example paint process of the vehicle manufacturing process in accordance with the teachings of the present disclosure.

Referring to FIG. 3, an example of the paint process 106 is provided, and includes a surface treatment process 302, a primer process 304, a base-clear (BC) coat process 306, and a paint inspection process 308. In one form, the surface treatment process 302 may include one or more of: a pretreatment process in which the vehicle body 104 is cleaned; an electrocoat (E-coat) process in which the vehicle body 104 is immersed in a wet paint using electrical current and in some applications, baked in an oven; and a sealer process in which a sealer (e.g., a synthetic material) that forms protective barrier on a surface of vehicle body is applied to the vehicle body 104 and, in some applications, the vehicle body 104 is baked in an oven. In one form, during the primer process 304, a primer is applied to the vehicle body 104, and in some applications, the vehicle body 104 is baked in an oven. After the primer process 304, the vehicle body 104 is treated with a base coat and clear coat at the BC coat process 306, which may also include a baking process in an oven. In the example paint process 106 of FIG. 3, after the BC coat process 306, the vehicle body 104 undergoes the paint inspection process 308 to determine whether one or more vehicle body imperfections are present on the vehicle body 104, and directs the vehicle body 104 to a post-paint area 310, such as but not limited to: an assembly bay 310-A at which the vehicle body 104 is prepared for full/final assembly at the assembly process 108; a repair bay 310-B at which the vehicle body is prepared for a spot treatment process to remedy the identified imperfections; and a rework bay 310-C at which the vehicle body 104 is prepped for a polish treatment process to strip the paint layers and prep the vehicle body 104 for the paint process again. While specific examples of the surface treatment process 302, the primer process 304, and the BC coat process 306 are provided, it should be readily understood that the specific steps provided at each process may include and/or omit examples steps provided herein.

Figure 4:
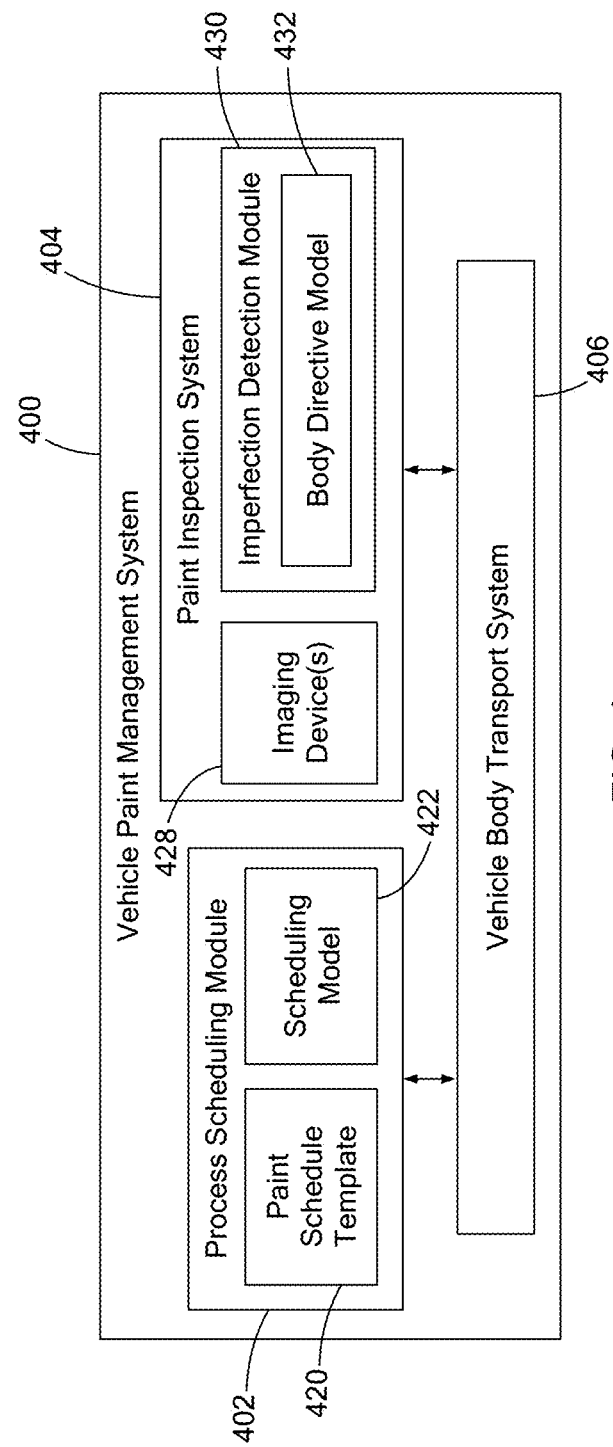
FIG. 4 is a block diagram of a vehicle paint management system in accordance with the teachings of the present disclosure.

Referring to FIG. 4, a vehicle paint management (VPM) system 400 is provided and is configured to manage the vehicle bodies 104-A through the paint process 106. In one form, the VPM system 400 includes a process scheduling module 402, a paint inspection system 404, and a vehicle body transport (VBT) system 406. In one form, the VBT system 406 is configured to transport the vehicle bodies 104 through the paint process 106 and may receive instructions from the paint scheduling module 402 and/or the paint inspection system 404 regarding the desired destination of the vehicle body 104. In one form, the VBT system 406 includes autonomous mobile transports having a fixture upon which the vehicle body 104 is held. In another form, the vehicle body transport system includes a conveyer system for supporting and moving the vehicle body 104. In an example application, the conveyer system is configured to include multiple rail/tracks (overhead and/or ground) and multiple fixtures traveling along the rail/track and configured to support the vehicle bodies 104. It should be readily understood that the VBT system 406 may be configured in various suitable ways and should not be limited to the examples provided herein.

The process scheduling module 402 is configured to define a paint application schedule for the vehicle bodies 104 based on at least one of a paint schedule template 420 and, if received, the notification of the potential vehicle body imperfection from the vehicle manufacturing system 150. In one form, the paint schedule template 420 provides a baseline paint process for the vehicle bodies 104, which may include the surface treatment process 302, the priming process, and the BC coat process 306. For a selected vehicle body, the process scheduling module 402 may receive the notification from the vehicle manufacturing system 150 regarding a potential vehicle body imperfection for the selected vehicle body. As indicated above, the notification may include location information of the potential vehicle body imperfection, the remedial action for addressing the potential vehicle body imperfection, and/or the recommended resource allocation. For example, if the notification indicates that a remedial action to address the imperfection is a pre-painting sanding process, the process scheduling module 402 is configured to modify the paint schedule template 420 for the selected vehicle by adding the pre-painting sanding process prior to the surface treatment process 302. In one form, the process scheduling module 402 is configured to include a scheduling model 422 that associates data from the notification to scheduling modifications to be made to the paint schedule template 420 to define a customized schedule for the selected vehicle. The scheduling model 422 may be a series of computer executable instructions that at least uses the data from the notification to generate the customized schedule for the selected vehicle. In another form, the process scheduling module 402 is configured to employ inputs from a paint process coordinator that manually defines the customized schedule for the selected vehicle based on the paint schedule template 420 and the notification for the selected vehicle.

Furthermore, by defining the schedules for the vehicle bodies 104, the process scheduling module 402 is further configured to track the resources to be used for performing the paint process 106 for the vehicle bodies 104 being processed on a given day and/or shift. For example, if multiple vehicle bodies 104 require a sanding process, the process scheduling module 402 may be configured to estimate the number of technicians needed during that shift and/or stagger the number of vehicles bodies 140 being processed. For example, the paint scheduling module 402 includes predetermined information that associates a threshold number of vehicle bodies to be processed in each shift and for each station. This information can be used to estimate number of technicians, shifts, and possibly supplies for performing the processes.

In one form, the paint inspection system 404 is configured to perform vision-based defect detection of the vehicle body 104 once the vehicle body 104 has begun paint process 106. In one form, the paint inspection system 404 includes one or more imaging devices 428 to obtain surface image data of the vehicle body 104 and an imperfection detection module 430 configured to detect a defect based on the surface image data. The imaging devices 428 are arranged at one or more locations along the paint process 106 and may be multidimensional cameras/scanners (e.g., two-dimensional or 3-dimensional cameras/scanners). In one example application, the imaging devices may be provided after each of the surface treatment process 302, the primer process 304, and the BC coat process 306. In another example, the imaging device(s) 428 may be provided after the primer process 304 and/or the BC coat process 306. In yet another example, a single imaging device 428 can be provided to capture multiple images of the vehicle body 104 after the primer process 304 or after the BC coat process 306. While multiple examples are provided, it should be readily understood that the imaging devices 428 can be distributed at different locations of the paint process 106 and can include a suitable number of devices.

The imperfection detection module 430 is configured to determine whether the vehicle body 104 has at least one surface imperfection after the priming process of the vehicle body 104. More particularly, using known image processing and defect detection systems, the imperfection detection module 430 is configured to identify surface imperfection and to further determine one or more characteristics of the surface imperfection based on the surface image. In one form, the one or more characteristics of the at least one surface imperfection includes at least one of a location of the at least one surface imperfection along the vehicle body, a type of the at least one surface imperfection (e.g., run-off, dent, chip, scratch, among others), and a size of the at least one surface imperfection.

The imperfection detection module 430 is further configured to selectively direct the vehicle body 104 to a subsequent process based on whether the surface imperfection is detected, the characteristics of the surface imperfection, and a body directive model 432. In one form, the body directive model 432 is configured to identify the subsequent process based on an input parameter, where the input parameter includes the characteristics of the at least one surface imperfection of the vehicle body. In an example application, the body directive model 432 may be defined as correlation data (e.g., one or more look-up tables) that associates characteristics of surface imperfections with a desired subsequent process. In another example, the body directive model 432 is defined using known machine learning techniques that associate characteristics of the surface imperfections with other parameters to a desired subsequent process. The other parameters may include, but are not limited to, capacity of subsequent process areas, resource availability, route/path efficiency, among other parameters that indicate whether the subsequent process is available to address the imperfections within a selected time frame.

In one form, the subsequent process is selected from among a spot treatment process, a polish treatment process, a subsequent paint process, and/or the assembly process 108. The spot treatment process may be selected to address a selected number of surface imperfections that may be at a nominal size. At the polish treatment process, the layers applied to the vehicle body 104 are removed and the vehicle body 104 goes through the paint process 106 from the beginning. The polish treatment is selected when, for example, the number of surface imperfections is greater than a selected threshold, the location of the surface imperfections are provided at varying locations along the vehicle body 104, the size of the surface imperfections is greater than a nominal size, and/or the type of surface imperfection.

In the event surface imperfections are not detected, the subsequent process can be the next process in the paint process 106 or the assembly process 108. For example, if the imperfection detection module 430 determines possible surface imperfection after the primer process 304 but prior to the BC coat process 306, the imperfection detection module 430 may select the BC coat process 306 as the subsequent process in response to not detecting a surface imperfection. From the BC coat process 306, the imperfection detection module 430 may perform another surface imperfection detection based on images of the vehicle body 104 after the BC coat process 306 to determine the subsequent process. In yet another example, the imperfection detection module 430 is configured to detect surface imperfections after the BC coat process 306, and if no imperfections are detected, the vehicle body 104 is directed for the assembly process 108.

In one form, the imperfection detection module 430 is configured to determine whether a surface imperfection is a reoccurring imperfection based on previously detected imperfections of previous vehicle bodies based on the one or more characteristics of the at least one surface imperfection and the one or more characteristics of the previous detected imperfections. If a reoccurring imperfection is detected, the imperfection detection module 430 is configured to issue a notification regarding the reoccurring imperfection. The notification can be provided to a paint process team to have the team address the issue and/or to the vehicle management system 150 for capturing the issue, which may be analyzed to determine if the reoccurring imperfection was caused by an upstream process and whether it may cause issued as assembly.

The vehicle manufacturing system 150 of the present disclosure employs a paint process model that associates identified faults of machines/tools of upstream processes to predict potential vehicle body imperfections that may affect the paint process 106. In addition, the vehicle manufacturing system 150 provides a notification highlighting the vehicle body imperfections and possible remedial actions to the VPM system 400 of the paint process 106. Using the notification, the VPM system 400 is able to proactively address possible imperfections and generate a customized schedule for the vehicle body for undergoing the paint process 106.

Furthermore, the vehicle paint management system 400 of the present disclosure employs a body directive model to direct vehicle bodies after the primer process, thereby reducing wait/staging time of the vehicle body 104. This may further reduce size of staging areas employed to hold the vehicle bodies (i.e., a staging process) and allow vehicle bodies to effortlessly enter desired subsequent processes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of directing a vehicle body through a paint process, the method comprising:
   obtaining, by a vehicle manufacturing system, process operation data from a vehicle body process, wherein the vehicle body process is configured to form the vehicle body and precedes the paint process of the vehicle body, the vehicle body process includes a stamping process, a body forming process, or a combination thereof, wherein the process operation data is indicative of an operation state of an identified machine performing a selected body operation as part of the vehicle body process;
   determining, by the vehicle manufacturing system, whether a recognized fault has occurred based on the process operation data;
   identifying a potential vehicle body imperfection based on a paint process model and the recognized fault;
   providing, by the vehicle manufacturing system, a notification to the paint process of the potential vehicle body imperfection for the vehicle body, wherein the notification includes location information of the potential vehicle body imperfection, a remedial action for addressing the potential vehicle body imperfection, a recommended resource allocation, or a combination thereof;
   in response to the notification of the potential vehicle body imperfection, obtaining, by a paint inspection system, a surface image data of the vehicle body and determining whether the vehicle body has at least one surface imperfection; and
   selectively directing, by the paint inspection system, the vehicle body to a subsequent process based on one or more characteristics of the at least one surface imperfection of the vehicle body.

2. The method of claim 1, wherein:
   the paint process model associates a plurality of potential faults for one or more machines performing the vehicle body process with one or more vehicle body imperfections,
   the recognized fault is provided from among the plurality of potential faults,
   the identified machine is selected from among the one or more machines, and
   the potential vehicle body imperfection is selected from among the one or more vehicle body imperfections.

3. The method of claim 1, wherein the remedial action includes having the vehicle body undergo a selected pre-paint process, providing a customized operation setting for the paint process, or a combination thereof.

4. The method of claim 1 further comprising:
   directing the vehicle body to the paint process having a surface treatment process, a priming process, a base-clear (BC) coat process, or a combination thereof;
   obtaining, by the paint inspection system, the surface image data of the vehicle body subsequent of the surface treatment process, the priming process, the BC coat process, of a combination thereof;
   determining, by the paint inspection system, whether the vehicle body has the at least one surface imperfection after the priming process and prior to a post-paint area of the vehicle body;
   determining, by the paint inspection system, the one or more characteristics of the at least one surface imperfection based on the surface image data in response to determining that the vehicle body has the at least one surface imperfection; and selectively directing, by the paint inspection system, the vehicle body to the subsequent process based on a body directive model configured to identify the subsequent process based on an input parameter, wherein the input parameter includes the one or more characteristics of the at least one surface imperfection of the vehicle body.

5. The method of claim 4 further comprising, in response to the notification from the vehicle manufacturing system, performing the remedial action to address the potential vehicle body imperfection prior to obtaining the surface image data.

6. The method of claim 4, wherein the one or more characteristics of the at least one surface imperfection includes at least one of a location of the at least one surface imperfection, a type of the at least one surface imperfection, and a size of the at least one surface imperfection.

7. The method of claim 4, wherein the subsequent process is selected from among a spot treatment process, a polish treatment process, and an assembly process.

8. The method of claim 4 further comprising selectively directing the vehicle body to a final assembly in response to the vehicle body not having the at least one surface imperfection.

9. A method of directing a vehicle body through a paint process having a surface treatment process, a priming process, and a base-clear (BC) coat process, the method comprising:
obtaining, from a vehicle manufacturing system, a notification of a potential vehicle body imperfection for the vehicle body prior to the paint process, wherein the notification includes location information of the potential vehicle body imperfection, a remedial action for addressing the potential vehicle body imperfection, a recommended resource allocation, or a combination thereof;
performing the remedial action to address the potential vehicle body imperfection;
obtaining, by a paint inspection system, a surface image data of the vehicle body subsequent of the surface treatment process, the priming process, the BC coat process, or a combination thereof, wherein the remedial action to address the potential vehicle body imperfection is performed prior to obtaining the surface image data;
determining, by the paint inspection system, whether the vehicle body has at least one surface imperfection after the priming process and prior to a post-paint area of the vehicle body;
determining, by the paint inspection system, one or more characteristics of the at least one surface imperfection based on the surface image data in response to determining that the vehicle body has the at least one surface imperfection; and
selectively directing, by the paint inspection system, the vehicle body to a subsequent process based on the one or more characteristics of the at least one surface imperfection of the vehicle body and a body directive model configured to identify the subsequent process based on an input parameter, wherein the input parameter includes the one or more characteristics of the at least one surface imperfection of the vehicle body.

10. The method of claim 9, wherein the one or more characteristics of the at least one surface imperfection includes at least one of a location of the at least one surface imperfection, a type of the at least one surface imperfection, and a size of the at least one surface imperfection.

11. The method of claim 9, wherein the subsequent process is selected from among a spot treatment process, a polish treatment process, and a final assembly.

12. The method of claim 9 further comprising selectively directing the vehicle body to a final assembly in response to the vehicle body not having the at least one surface imperfection.

13. The method of claim 9, wherein the input parameter further includes available resources of the subsequent process.

14. The method of claim 9, further comprising:
determining whether the at least one surface imperfection is a reoccurring imperfection based on a previous detected imperfection of a previous vehicle body, based on the one or more characteristics of the at least one surface imperfection and the one or more characteristics of the previous detected imperfection; and
issuing a notification regarding the reoccurring imperfection in response the at least one surface imperfection being determined as the reoccurring imperfection.

15. The method of claim 9, wherein the remedial action includes having the vehicle body undergo a selected pre-paint process, providing a customized operation setting for the paint process, or a combination thereof.

16. A method of directing a vehicle body through a paint process, the method comprising:
obtaining, by a vehicle manufacturing system, process operation data from a vehicle body process, wherein the vehicle body process is configured to form the vehicle body and precedes the paint process of the vehicle body, the vehicle body process includes a stamping process, a body forming process, or a combination thereof, wherein the process operation data is indicative of an operation state of an identified machine performing a selected body operation as part of the vehicle body process;
determining, by the vehicle manufacturing system, whether a recognized fault has occurred based on the process operation data;
identifying a potential vehicle body imperfection based on a paint process model and the recognized fault;
in response to identifying the potential vehicle body imperfection, performing a remedial action during the paint process to address the potential vehicle body imperfection;
obtaining, by a paint inspection system, a surface image data of the vehicle body subsequent of a priming process, wherein the paint process includes a surface treatment process, the priming process, a base-clear (BC) coat process, and a post-paint area provided after the priming process and the BC coat process;
determining, by the paint inspection system, whether the vehicle body has at least one surface imperfection after the priming process and prior to the post-paint area of the vehicle body;
determining, by the paint inspection system, one or more characteristics of the at least one surface imperfection based on the surface image data in response to determining that the vehicle body has the at least one surface imperfection; and
selectively directing, by the paint inspection system, the vehicle body to a subsequent process based on the one or more characteristics of the at least one surface imperfection of the vehicle body and a body directive model configured to identify the subsequent process based on an input parameter, wherein the input parameter includes the one or more characteristics of the at least one surface imperfection of the vehicle body.

17. The method of claim 16, wherein the remedial action includes having the vehicle body undergo a selected pre-paint process, providing a customized operation setting for the paint process, or a combination thereof.

18. The method of claim 16, wherein:
the paint process model associates a plurality of potential faults for one or more machines performing the vehicle body process with one or more vehicle body imperfections,
the recognized fault is provided from among the plurality of potential faults,
the identified machine is selected from among the one or more machines, and
the potential vehicle body imperfection is selected from among the one or more vehicle body imperfections.

19. The method of claim 17, wherein the one or more characteristics of the at least one surface imperfection includes at least one of a location of the at least one surface imperfection, a type of the at least one surface imperfection, and a size of the at least one surface imperfection.

* * * * *